United States Patent [19]

Kimura

[11] Patent Number: 4,475,133
[45] Date of Patent: * Oct. 2, 1984

[54] VIDEO TAPE RECORDING APPARATUS WITH TIME BASE CORRECTION

[75] Inventor: Kenji Kimura, Tachikawa, Japan

[73] Assignee: Olympus Optical Company Limited, Tokyo, Japan

[*] Notice: The portion of the term of this patent subsequent to Jan. 19, 1999 has been disclaimed.

[21] Appl. No.: 319,617

[22] Filed: Nov. 9, 1981

Related U.S. Application Data

[63] Continuation of Ser. No. 120,085, Feb. 8, 1980, abandoned.

[30] Foreign Application Priority Data

Feb. 13, 1979 [JP] Japan .................................. 54-15331
Feb. 16, 1979 [JP] Japan .................................. 54-16778

[51] Int. Cl.³ ............................................. H04N 5/92
[52] U.S. Cl. ................................................ 360/36.1
[58] Field of Search .................... 360/22, 23, 26, 27, 360/33.1, 32, 36.1, 51; 358/323, 320, 337, 339, 326

[56] References Cited

U.S. PATENT DOCUMENTS 3,975,764  8/1976  Kobayashi et al. .................. 360/23
4,048,658  9/1977  Nakagawa ......................... 360/22 X
4,181,822  1/1980  Workman .......................... 360/23 X
4,196,445  4/1980  Okada et al. ..................... 358/326 X
4,203,076  5/1980  Yamashita ....................... 358/339 X
4,218,713  8/1980  Horak et al. ..................... 360/22 X
4,291,344  9/1981  Kimura ............................. 360/36.1
4,312,019  1/1982  Kimura ............................. 360/22
4,329,718  5/1982  Kimura ............................. 360/22 X
4,393,418  7/1983  Kimura ............................. 360/22

Primary Examiner—Donald E. McElheny, Jr.
Attorney, Agent, or Firm—Toren, McGeady and Stanger

[57] ABSTRACT

A video tape recording apparatus using an Hadamard transformation system for recording and reproducing a video signal is disclosed. Facilities are provided for distributing the video signal to a plurality of channels, recording and reproducing the distributed video signals with a plurality of magnetic heads, generating a window pulse from a time-base correction signal obtained by separating a horizontal synchronizing signal from the video signal, means for discriminating phase coincidence of the window pulse and a sampling signal of one phase for transformation, detecting a time-base correction signal by the phase coincidence signal immediately after extinction thereof, and generating a sampling signal of a proper phase as an inverse transformation signal on the basis of the time-base correction signal.

3 Claims, 6 Drawing Figures

VIDEO TAPE RECORDING APPARATUS WITH TIME BASE CORRECTION

This is a continuation of application Ser. No. 120,085 filed Feb. 8, 1980, now abandoned.

BACKGROUND OF THE INVENTION

The present invention relates to a video tape recording apparatus using an Hadamard transformation system for recording and reproducing a video signal.

In a recently developed video tape recording apparatus a video signal is distributed to a plurality of channels, and the thus distributed video signals are recorded and reproduced with a plurality of fixed type magnetic heads. This apparatus involves the so-called Hadamard tranformation system.

In such video tape recording apparatus, however, in order to obtain an Hadamard transformation signal, an input information is converted into a time series signal of n phasees, so that the input information is usually sampled by some common means.

Further, in recording and reproduction, it is not only necessary to record and reproduce an Hadamard transformation signal but also necessary to record and reproduce a sampling signal with an independent channel or by multiplexing or the like.

In recording and reproducing a sampling signal, however, it is difficult to precisely transmit a phase information from the recording system to the reproducing system if for example, an FM modulation means is used, the phase of a demodulated sampling signal becomes unstable relative to the Hadamard transformation signal after reproduction owing to phase distortion or the like of the FM transmission system.

Therefore, if a sampling signal having such an unstable phase is used as a sampling signal during Hadamard inverse transformation, the reproduced picture image deteriorates considerably.

Moreover, in recording and reproducing apparatus using a fixed-type multi-channel head, time-base fluctuation or, a time jitter and drift in a reproduced signal between channels may be caused by positioning errors of each head and unevenness in the running of the tape.

In order to avoid this problem, a time-base correction signal is generally inserted into horizontal blanking phase portion of a transformed signal and recorded at the time of recording or the like. During reproduction, the recorded time-base correction signal is separated from the transformed signal and the separated signal is used as a signal for detecting time-base fluctuation so as to correct the time-base fluctuations.

The time-base correction is carried out over the whole channel signal and it is also necessary to produce coincidence with the time-base over the whole channel signal, but in practice, the detection of a time delay of a correction loop and time-base fluctuation of the time-base correction device is carried out by a sampling means every period of a horizontal signal, so that information of the time-base fluctuation at the portion other than the sampling point is lacking. For this reason, it is very difficult to completely correct time-base fluctuations. Accordingly, the component which is impossible to be completely correct remains as a residual jitter, and the jitter-drift component remains as part of a reproduced channel signal.

Therefore, the synchronizing signal is separated from the output signal of the time-base corrector independently coupled to each channel at the time of reproduction, the separated synchronizing signal reproduces the signal transformed by Hadamard transformation or time division to as the original video signal by inverse transformation, and the reproduced video signal is coupled to the separated synchronizing signal.

The residual jitter contained in each channel is dispersed and averaged into the whole video signal in an inverse transformer, and in practice, there a difference between the synchronizing residual jitter of one channel and the residual jitter of the reproduced video signal is produced.

In this case, apparent resolution is inadequate because distortion is produced on a monitor screen or the signal is finely modulated on the screen by a difference of residual jitters.

SUMMARY OF THE INVENTION

It is an object of the present invention to eliminate the above described disadvantages of the conventional video tape recording apparatus.

It is another object of the present invention to provide a video tape recording apparatus for automatically obtaining a proper sampling signal necessary for Hadamard inverse transformation at the time of reproduction even if a phase distortion exists in the transmission path of a recording and reproduction system, thereby obtaining a good reproduced picture.

It is further object of the present invention to provide a video tape recording apparatus in which a sinchronizing signal is stabilized to obtain good picture image and good resolution by making the residual jitter contained in a reproduced video signal extremely close to the residual jitter of a synchronizing signal coupled to the reproduced video signal.

According to the present invention a video tape recording apparatus for recording and reproducing a video signal comprises means for distributing the video signal to a plurality of channels, means for recording and reproducing the distributed video signals by a plurality of magnetic heads, means for generating a window pulse from a time-base correction signal obtained by separating a horizontal synchronizing signal from the video signal, means for discriminating phase coincidence of the window pulse and a sampling signal of one phase for transformation, means for detecting a time-base correction signal by the phase coincidence signal immediately after extinction thereof and means for generating a sampling signal of a proper phase as an inverse transformation signal on the basis of the time-base correction signal.

A video tape recording apparatus for recording and reproducing a video signal comprises means for distributing the video signal to a plurality of channels, means for recording and reproducing the distributed video signals by a plurality of magnetic heads, means for obtaining a plurality of channel signals coincident with a time-base by a time-base corrector and means for obtaining a synchronizing signal for correcting the time-base contained in each channel by a logical means, the residual jitters containing in the synchronizing signal having a mean residual jitter component of all channels.

DESCRIPTION OF THE PREFERRED EMBODIMENT

Figure 1:
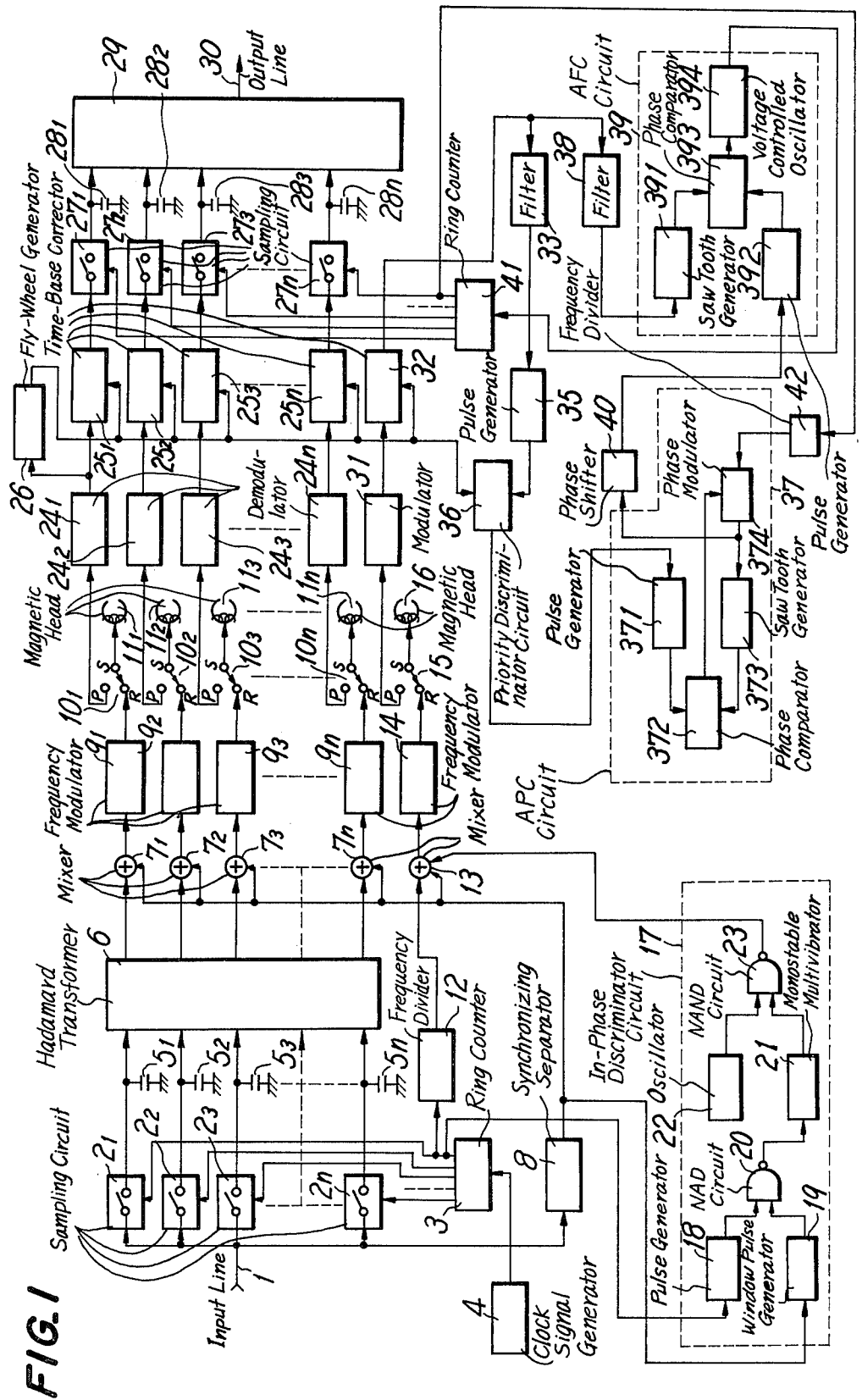
FIG. 1 is a block diagram showing a circuit arrangment of a video tape recording apparatus according to the present invention.

Referring now to the drawing one embodiment of a video tape recording apparatus according to the present invention will be explained.

In FIG. 1, an input line 1 which receives an input video signal supplied, and this is connected to sampling circuits $2_1, 2_2 \ldots 2_n$ of n channels. These sampling circuits $2_1, 2_2 \ldots 2_n$ are connected to each phase output terminal of a ring counter 3 whose input terminal is connected to a clock signal generator 4, so that sampling signals from the ring counter 3 in accordance with the clock output of the clock signal generator 4 generate time-series signals obtained by time-dividing the input video signal through the sampling circuits $2_1, 2_2 \ldots 2_n$.

Each output terminal of the sampling circuits $2_1, 2_2 \ldots 2_n$ is connected to sample hold capacitors $5_1, 5_2 \ldots 5_n$, respectively, and further connected to an Hadamard transformer 6. The Hadamard transformer 6 comprises a resistor matrix or the like and generates an Hadamard transformation signal of n channels from the output held in the sampling hold capacitors $5_1, 5_2 \ldots 5_n$.

Each output terminal of the Hadamard transformer 6 is connected to one input terminal of mixers $7_1, 7_2 \ldots 7_n$. The other input terminals of these mixers $7_1, 7_2 \ldots 7_n$ are connected to a synchronizing separator 8. The input terminal of the synchronizing separator 8 is connected to the input line 1 so as to separate a horizontal synchronizing signal contained in the input video signal and generate it as a time-base correction signal.

The mixers $7_1, 7_2 \ldots 7_n$ serve to insert the time-base correction signal into a portion corresponding to a horizontal blanking phase of an Hadamard transformation signal in each channel for absorbing a jitter-drift component contained in the Hadamard transformation signal in each channel at the time of reproducing.

The output terminal of the mixers $7_1, 7_2 \ldots 7_n$ are connected to frequency modulators $9_1, 9_2 \ldots 9_n$, FM-demodulate outputs of the mixers $7_1, 7_2 \ldots 7_n$ and generate the output of an FM carrier.

The output terminal of these frequency modulators $9_1, 9_2 \ldots 9_n$ are connected to recording and reproducing magnetic heads $11_1, 11_2 \ldots 11_n$ through recording contacts R-S of change-over switches $10_1, 10_2 \ldots 10_n$.

An output terminal of any phase of the ring counter 3 (the output terminal of the first phase of the sampling circuit $2_1$ in the illustrated embodiment) is connected to a frequency divider 12, and the output terminal of the divider 12 is connected to a mixer 13. The divider 12 comprises a flip-flop circuit and generates the output of a predetermined frequency $f_s$ by frequency-dividing the output of one phase of the ring counter 3. Moreover, the mixer 13 is connected to the synchronizing separator 8, the output terminal of the mixer 13 is connected to a frequency modulator 14 similar to the above, and the output terminal of the modulator 14 is connected to a recording and reproducing magnetic head 16 through a recording contact R-S of a change-over switch 15.

The respective output terminals of the ring counter 3 and the synchronizing separator 8 are connected to a phase coincidence discriminator circuit 17 for discriminating phase coincidence of the sampling signal and the time-base correction signal. The circuit 17 comprises a pulse generator 18, a window pulse generator 19, a NAND circuit 20, a monostable multivibrator 21, an oscillator 22 and a NAND circuit 23. If a pulse output of the pulse generator 18 triggered by a sampling signal of one phase of the ring counter 3 is existent within a period of window pulse generation of the window pulse generator 19 triggered by a time-base correction signal of the synchronizing separator 8, the circuit 17 discriminates it as in-phase, triggers the monostable multivibrator 21 after receiving the output of the NAND circuit 20, supplies a burst-like oscillation output of the oscillator 22 as an in-phase signal to said mixer 13 through the NAND circuit 23 for a period of pulse generation of the multivibrator 21, and mixes it with the output of the frequency divider 12. In this case, the shorter the pulse output generation period of the window pulse generator 19 the more precise the in-phase discrimination, but in practice, use is made of a pulse having positive polarity of about 100 nsec, and a pulse having positive polarity of about 20 nsec is used for the pulse generator 18 corresponding thereto. Moreover, a pulse of about 30 nsec of a pulse generation period is used for the monostable multivibrator 21 and an oscillation frequency fo of the oscillator 22 for generating the output within this period can be discriminated against an output frequency fs of the frequenct divider 12, and is set about 1.5 times by which this frequency does not have any influence upon second and third harmonics of the frequency fs.

The recording and reproducing magnetic heads $11_1, 11_2 \ldots 11_n$ are connected to demodulators $24_1, 24_2 \ldots 24_n$, respectively, through each reproducing contact P-S of the change-over switches $10_1 10_2 \ldots 10_n$, and the output terminals of the demodulators $24_1, 24_2 \ldots 24_n$ are connected to time-base correctors $25_1, 25_2 \ldots 25_n$, respectively. The time-base correctors $25_1, 25_2 \ldots 25_n$ absorb a jitter-drift component contained in the reproduced Hadamard transformation signal. In this case, the time-base correctors $25_1, 25_2 \ldots 25_n$ are connected to receive the output of a flywheel oscillator 26 as a reference signal. The flywheel oscillator 26 is connected to the output end of the demodulator $24_1$ so as to generate an output signal corresponding to a time-base correction signal. It is a matter of course that the jitter-drift component is absorbed and removed from the output signal in this case.

The output terminals of the time-base correctors $25_1, 25_2 \ldots 25_n$ are connected to sampling circuits $27_1, 27_2 \ldots 27_n$. The sampling circuits $27_1, 27_2 \ldots 27_n$ successively generate the output of each time-base correctors $25_1, 25_2 \ldots 25_n$ in accordance with the sampling signal.

The output terminals of the sampling circuits $27_1, 27_2 \ldots 27_n$ are connected to sample hold capacitors $28_1, 28_2 \ldots 28_n$, respectively and further connected to an Hadamard inverse transformer 29. The Hadamard inverse transformer 29 comprises a resistor matrix or the like to reproduce the original video signal from the output held by the sample hold capacitors $28_1, 28_2 \ldots 28_n$ and generate to an output line 30.

The reproducing magnetic head 16 is connected to demodulator 31 through the reproducing contact P-S of the change-over switch 15, and the output terminal of the demodulator 31 is connected to a time-base corrector 32. The time-base corrector 32 also receives an output of the flywheel oscillator 26 in the same manner so as to absorb and remove the jitter-drift component of the output reproduced by the magnetic head 16.

The output terminal of the time-base corrector 32 is connected to a bandpass filter 33. The filter 33 only passes a phase coincidence signal having a frequency of fo generated from the phase coincidence discriminator 17. The output terminal of the filter 33 is connected to a pulse generator 35, and the output terminal of the pulse generator 35 is connected to one input terminal of a priority discriminator circuit 36 is connected to the other output terminal of the flywheel oscillator 26.

Figure 2:
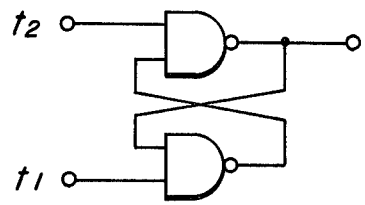
FIG. 2 is a circuit diagram showing a priority discriminator used in the apparatus shown in FIG. 1.

The priority discriminator 36 consists of an R-S flip-flop as shown in FIG. 2. When an input end terminal $t_1$ receives a pulse output of the pulse generator 35 triggered by the above-described phase coincidence signal, the priority discriminator 36 is set and reset after receiving the output of the flywheel oscillator 26. That is, the priority discriminator circuit 36 detects the output of the flywheel oscillator 26 immediately after extinction of the phase coincidence signal, i.e., a time-base correction signal.

The output terminal of the priority discriminator circuit 36 is connected to an APC (Automatic phase control) circuit 37. The APC circuit 37 comprises a pulse generator 371, a phase comparator 372, a saw-tooth signal generator 373 and a phase modulator 374, thereby to compare the output of the pulse generator 371 triggered by a trailing edge of the discriminator 36 with the output of the saw-tooth signal generator 373 for receiving the input through the phase modulator 374 so as to control a phase delay amount of said phase demodulator 374 by a voltage in accordance with a phase difference in this case. Such control system constitutes a negative feedback loop, so that the output of the phase modulator 374 coincides with the output phase of the discriminator 36. The output terminal of the phase modulator 374 is connected to a phase shifter 40.

The output terminal of the time-base corrector 32 is connected to another bandpass filter 38. The filter 38 only passes a sampling signal of a frequency fs generated from the frequency divider 12.

The output terminal of the filter 38 and the output terminal of the phase shifter 40 are connected to an AFC (automatic frequency control) circuit 39. The AFC circuit 39 reproduces a sampling signal of the same frequency as that of the ring counter 3, and comprises a saw-tooth signal generator 391, a pulse generator 392, a phase comparator 393 and a voltage control oscillator 394, to phase-compare in the phase comparator 393 the output of the saw-tooth signal generator 391 triggered by the output of the filter 38 with the output of the pulse generator 392 triggered by the output of the phase modulator 374 through phase shifter 40, thereby to control the centerfrequency of the output signal of the voltage controlled oscillator 394 by a voltage in accordance with a phase difference in this case.

The output terminal of the voltage controlled oscillator 394 is connected to a ring counter 41.

The ring counter 41 determines a sampling phase in accordance with the output of the voltage controlled oscillator 394 and generates a sampling signal for sampling the sampling circuits $27_1$, $27_2$ . . . $27_n$. An any phase output terminal (the output terminal of the phase of the sampling circuit $27_n$ in the illustrated embodiment) of the ring counter 41 is connected to the input terminal of the phase modulator 374 of the PAC circuit 37 through the frequency divider 42.

In this case, the any phase output terminal of the ring counter 41 is connected to the pulse generator 392 through the frequency divider 42, the phase modulator 374 and the phase shifter 40 so as to constitute a negative feedback loop in the AFC circuit 39, thereby to control the center frequency of the voltage controlled oscillator 394 to coincide with the frequency of the sampling signal of the ring counter 3.

The operation of the apparatus constructed as described above will be explained as follows. Let the recording contacts R-S of the change-over switches $10_1$, $10_2$ . . . $10_n$ and 16 be closed in the recording condition.

In this state, if an input video signal is supplied to the input line and clock signal are generated in the clock generator 4, sampling signal is generated by the ring counter 3 in response to the clock signal so that each sampling circuit $2_1$, $2_2$ . . . $2_n$ is successively sampled. Then, the input video signal is converted into a time-series signal and sample-held in the sample hold capacitors $5_1$, $5_2$ . . . $5_n$.

Thereafter, each sample hold output of the sample hold capacitors $5_1$, $5_2$ . . . $5_n$ is supplied to the Hadamard transformer 6, transformed into an Hadamard transformation signal of n channels and supplied to one input terminal of the mixers $7_1$, $7_2$ . . . $7_n$.

At the same time, a horizontal synchronizing signal contained in the input video signal of the input line 1 is separated by the synchronizing separator 8 and supplied to the mixers $7_1$, $7_2$ . . . $7_n$ as a time-base correction signal.

Then, the mixers $7_1$, $7_2$ . . . $7_n$ mix the time-base correction signal with the Hadamard transformation signal, and supply the mixed signal to the frequency modulators $9_1$, $9_2$ . . . $9_n$. Accordingly, the frequency modulators $9_1$, $9_2$ . . . $9_n$ FM-modulate the output from the mixers $7_1$, $7_2$ . . . $7_n$ and generate it as the output of an FM carrier. Then, the output is supplied to the magnetic heads $11_1$, $11_2$ . . . $11_n$ through recording contacts R-S of the change-over switches $10_1$, $10_2$ . . . $10_n$ are recorded on a magnetic tape (not shown) or the like.

A sampling signal of one phase of the ring counter 3 is frequency-divided into a predetermined frequency fs through the frequency divider 12 and supplied to the mixer 13 together with a time-base correction signal from the synchronizing separator 8.

Figure 3:
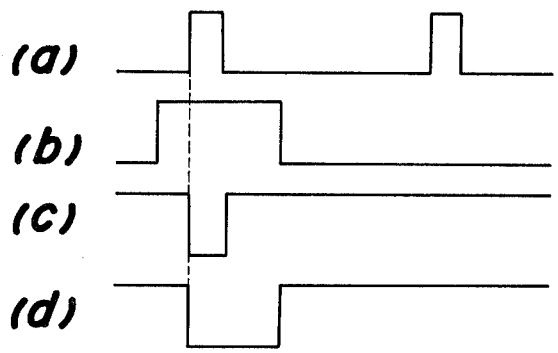
FIGS. 3 and 4 are waveforms showing signals generated in the apparatus shown in FIG. 1.

The sampling signal of the one phase of the ring counter 3 and the time-base correction signal of the synchronizing separator 8 are also supplied to the phase coincidence discriminator circuit 17. The discriminator circuit 17 discriminates whether or not the pulse output of the pulse generator 18 triggered by the sampling signal occurs within a window pulse of the window pulse generator 19 triggered by the time-base correction signal. When the pulse output occurs during the window pulse, the circuit 17 discriminates i.e., indicates, phase coincidence, in generates the output the NAND circuit 20 which triggers monostable multivibrator 21 and generates the output of the oscillator 22 as a phase coincidence signal only during pulse generator of the multivibrator 21. This condition is shown in FIG. 3. In FIG. 3, waveform a is an output signal of the pulse generator 18, waveform b is an output signal of the window pulse generator 19, waveform c is an output signal of the NAND circuit 20, and waveform d is an output signal of the monostable multivibrator 21.

The output of the phase coincidence discriminator circuit 17 is also supplied to the mixer 13.

Then, the mixer 13 mixes the time-base correction signal and the phase coincidence signal with the output of the frequency divider 12 and generates the mixed signal to the frequency modulator 14. Therefore, the frequency modulator 14 FM-demodulates the output from the mixer 13 and generates the output of an FM carrier in the same manner as described above, thereby to supply the output to the magnetic head 16 through the recording contact R-S of the change-over switch 15 thereby to record it on a magnetic tape (not shown) or the like.

To reproduce, or play back, the reproducing contacts P-S of the change-over switches $10_1$ $10_2$ ... $10_n$ and 15 are closed. Hence, the outputs of the magnetic heads $11_1$, $11_2$ ... $11_n$ are supplied to the demodulators $24_1$, $24_2$ ... $24_n$ through the reproducing contacts P-S of the change-over switches $10_1$, $10_2$ ... $10_n$ and demodulated therein. Further, the outputs of these demodulators $24_1$, $24_2$ ... $24_n$ are supplied to the time-base correctors $25_1$, $25_2$ ... $25_n$, which, with the output of the flywheel oscillator 26 as a reference signal absorb, the jitter-drift component contained in the reproduced Hadamard transformation signal and supply the output to the sampling circuits $27_1$, $27_2$ ... $27_n$.

Figure 4:
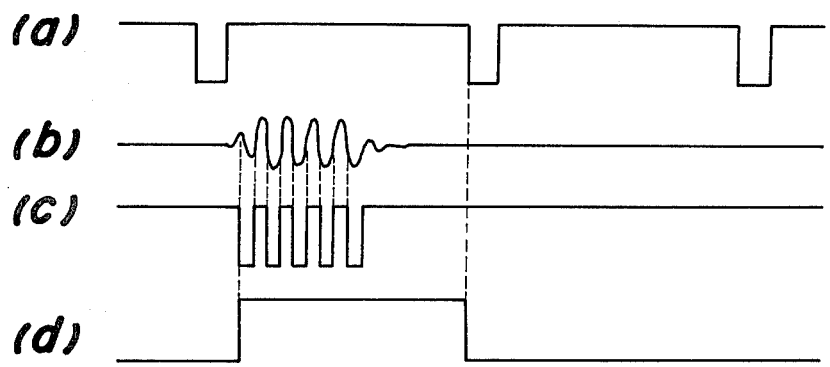

The output of the magnetic head 16 is also supplied to the demodulator 31 through the reproducing contact P-S of the change-over switch 15 and demodulated therein, and thereafter the output of the demodulator 31 is supplied to the time-base corrector 32, where the jitter-drift component is removed in the same manner as described above. Further, the output of the time-base corrector 32 is supplied to the filter 33, so that only the burst-like phase coincidence signal as a frequency fo of the phase coincidence discriminator circuit 17 is delivered. This signal is supplied to the priority discriminator 36. This priority discriminator 36 receives the output of the flywheel oscillator 26 and is set by the initial output of the pulse generator 35 triggered by the phase coincidence to generate outputs and is reset after receiving the output of the flywheel oscillator 26. That is, this resetting action detects the output of the flywheel oscillator 26 immediately after extinction of the phase coincidence signal. This condition is shown in FIG. 4. That is, in FIG. 4, waveform a is an output signal of the flywheel oscillator 26, waveform b is an output signal of the filter 33, waveform c is an output signal of the pulse generator 35 and waveform d is an output signal of the priority discriminator 36.

The output of the priority discriminator 36 is supplied to the APC circuit 37. Here, the phase comparator 372 phase-compares the output of the pulse generator 371 triggered by the trailing edge of the discriminator 36 with the output of the saw-tooth signal generator 373 which receives the input through the phase modulator 374 thereby to control a phase dely amount of the phase modulator 374 by a voltage in accordance with the phase difference in this case. Thus, the output phase of the phase modulator 374 coincides with the output phase of the priority discriminator 36.

The output of the time-base corrector 31 is also supplied to the filter 38 so that only a sampling signal of a frequency fs of the frequency divider 12 is delivered.

This signal is supplied to the AFC circuit 39. Here, the phase comparator 393 phase-compares the output of the saw-tooth signal generator 391 triggered by the output of the filter 38 with the output of the pulse generator 392 triggered by the output of the phase modulator 374 thereby to control the center frequency of the output signal of the voltage controlled oscillator 394 by a voltage in accordance with a phase difference.

In the AFC circuit 39 the pulse generator 392 receives the pulse formed by dividing the sampling signal of one phase of the ring counter 41 by the frequency divider 42 and supplying it to the phase demodulator 374, through the phase shifter 40. This forms a negative feedback loop, so that the oscillator 394 generates a frequency output equal to the frequency of the sampling signal of the ring counter 3. At the same time, according to the effect of the PAC circuit 37, the output phase of the phase modulator 374 coincides with the output phase of the priority discriminator 36, so that the output of the AFC circuit 39 is generated on the basis of a predetermined output, i.e., a predetermined time-base correction signal of the flywheel oscillator 26. Accordingly, when the phase shift of the phase shifter 40 in the negative feedback loop is set under this condition, the output of the proper phase as a Hadamard inverse transformation can be obtained as a sampling signal.

The output of such AFC circuit 39 is supplied to the ring counter 41. Then, a sampling signal is generated from the ring counter 41 so as to sample the sampling circuits $27_1$, $27_2$ ... $27_n$. The outputs of these sampling circuits $27_1$, $27_2$ ... $27_n$ are held by the sample hold capacitors $28_1$, $28_2$ ... $28_n$ and thereafter supplied to the Hadamard inverse transformer 29, reproduced as original video signal and deliver to the output line 30 as a reproduced video signal.

According to this construction, a sampling signal of a proper phase and frequency for inverse transformation can be reproduced on the basis of the time-base correction signal immediately after extinction of the phase coincidence signal of the window pulse obtained from the time-base correction signal and the sampling signal of one phase for Hadamard transformation from the phase coincidence signal, so that even if any phase distortion is existent in the transformission path of the recording and reproducing system, such distortion has no influence at all but the optimum sampling signal is constantly obtained, thereby to obtain a good reproduced picture image. Moreover, in this case, the time-base correction signal, i.e., horizontal synchronizing signal as the basis for generating the sampling signal for the inverse transformation is not synchronized with the sampling signal for Hadamard transformation (which is apparent from the action of the priority discriminator circuit in this embodiment), so that the disadvantage of distortion or noise appearing on the screen at the time of transformation considered by synchronization of these signals can be removed, and from this point it is possible to obtain a picture image of good quality.

Another embodiment of the present invention will be explained with reference to FIGS. 5 and 6. An input video signal 51 is supplied to an Hadamard transformer 52 and time-divided and transformed into 8 channels therein. A signal from the transformer 52 is supplied to mixers $53_{-1}$, $53_{-2}$ ... $53_{-8}$ and supplied to frequency modulators $55_{-1}$, $55_{-2}$ ... $55_{-8}$ together with a signal from a synchronizing separator 54.

The frequency modulators $55_{-1}$, $55_{-2}$ ... $55_{-8}$ are connected to recording and reproducing heads $59_{-1}$, $59_{-2}$ ... $59_{-8}$ through recording contacts $57_{-1}$, $57_{-2}$ ... $57_{-8}$ of change-over switches $56_{-1}$, $56_{-2}$ ... $56_{-8}$.

Reproducing contacts $58_{-1}$, $58_{-2}$ ... $58_{-8}$ of the change-over switches $56_{-1}$, $56_{-2}$ ... $56_{-8}$ are connected to demodulators $60_{-1}$, $60_{-2}$ ... $60_{-8}$, and the demodulators $60_{-1}$, $60_{-2}$ ... $60_{-8}$ are connected to time-base correctors $61_{-1}$, $61_{-2}$ ... $61_{-8}$, respectively.

The time-base correctors $61_{-1}$, $61_{-2}$ ... $61_{-8}$ are also connected to a flywheel oscillator 12 to successively receive signal from the flywheel oscillator 62 which is connected to the first demodulator $60_{-1}$.

The signals from the time-base correctors $61_{-1}$, $61_{-2}$ ... $61_{-8}$ are supplied to an inverse transformer 63 and supplied to synchronizing separators $64_{-1}$, $64_{-2}$ ... $64_{-8}$.

The signals from the synchronizing separators $64_{-1}$, $64_{-2}$ ... $64_{-8}$ are supplied to a mixer 67 through a NOR circuit 65, and the mixer 17 is also connected to the inverse transformer 63 through an analog gate 66. The mixer generates a reproduced video signal.

Figure 5:
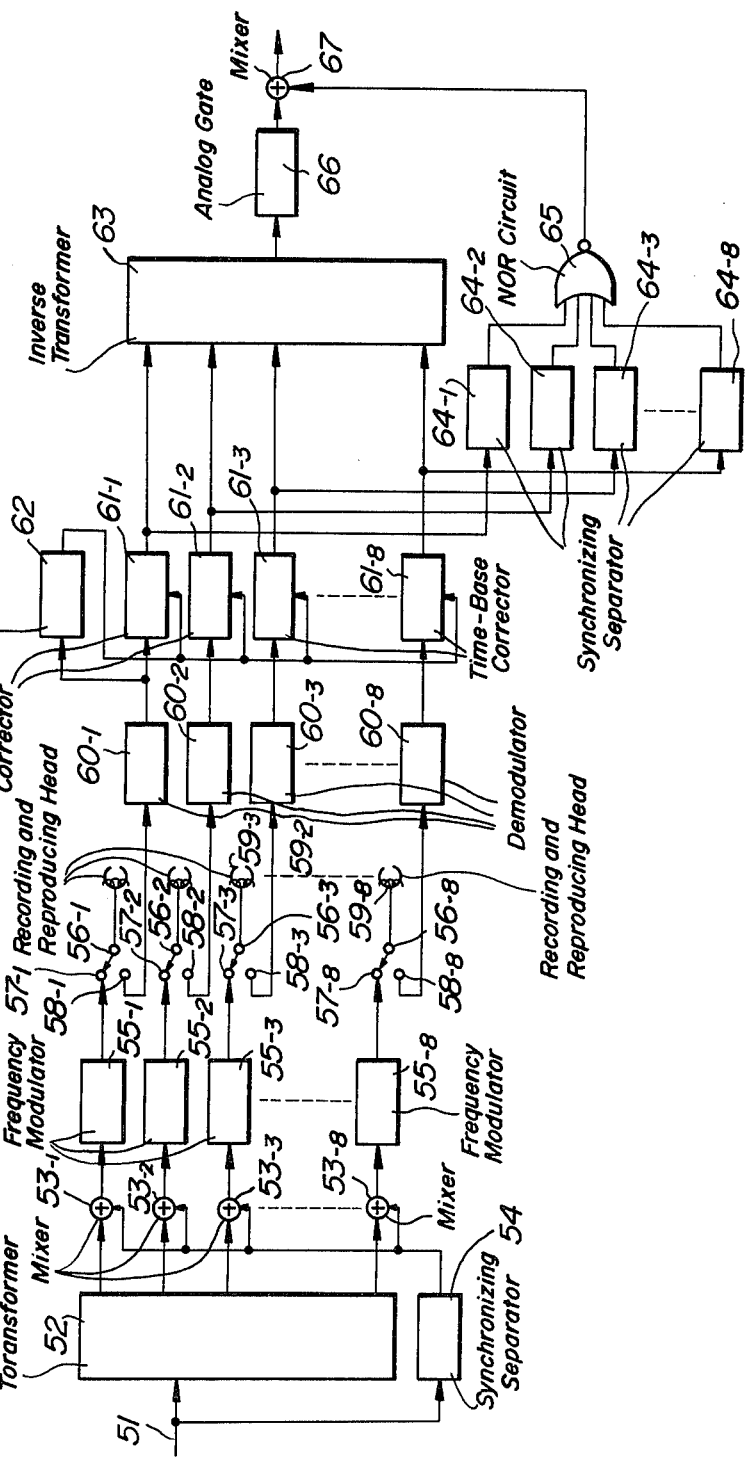
FIG. 5 is a block diagram showing a circuit arrangement of another embodiment of a video tape recording apparatus according to the present invention.

In the recording mode of FIG. 5, the video signal 51 is transformed into signals of 8 channels by the Hadamard transformer 52 and its outputs are supplied to the mixers $53_{-1}$, $53_{-2}$ ... $53_{-8}$, respectively.

The above video signal 51 is also suppled to the synchronizing separator 54 so that the horizontal synchronizing signal contained in the video signal 51 is separated.

The output signal of the synchronizing separator 54 is a time-base correction signal, and this signal becomes one input signal of the mixers $53_{-1}$, $53_{-2}$ ... $53_{-8}$, and is inserted into horizontal blanking phase portions transformation signals of each channel. Each output signal of the mixers $53_{-1}$, $53_{-2}$ ... $53_{-8}$ is supplied to the frequency modulators $55_{-1}$, $55_{-2}$ ... $55_{-8}$ and frequency demodulated therein. Each output of the frequency modulators $55_{-1}$, $55_{-2}$ ... $55_{-8}$ is an FM carrier, and this carrier is supplied to the recording heads $59_{-1}$, $59_{-2}$ ... $59_{-8}$ through the recording contacts $57_{-1}$, $57_{-2}$ ... $57_{-8}$ of the change-over switches $56_{-1}$, $56_{-2}$ ... $56_{-8}$.

During reproduction the reproduced outputs of the recording and reproducing heads $59_{-1}$, $59_{-2}$ ... $59_{-8}$ become respective input signals of the demodulators $60_{-1}$, $60_{-2}$ ... $60_{-8}$ through the reproducing contacts $58_{-1}$, $58_{-2}$ ... $58_{-8}$ of the change-over switches $56_{-1}$, $56_{-2}$ ... $56_{-8}$. Each output from the demodulators $60_{-1}$, $60_{-2}$ ... $60_{-8}$ becomes each input signal of the time-base correctors $61_{-1}$, $61_{-2}$ ... $61_{-8}$, and each output signal corrected by the time-base correctors $61_{-1}$, $61_{-2}$ ... $61_{-8}$ is supplied to the inverse transformer 63.

The time-base correctors $61_{-1}$, $61_{-2}$ ... $61_{-8}$ also receive the output of the flywheel locked 62 oscillated by a synchronizing signal contained in the output signal of the first modulator $60_{-1}$ and serving as a reference signal of respective time-base correctors $61_{-1}$, $61_{-2}$ ... $61_{-8}$.

The signal in which the time-base is corrected, relative to this reference signal, is applied to the inverse transformer 63 and the synchronizing separators $64_{-1}$, $64_{-2}$ ... $64_{-8}$.

The output of the inverse transformer 63 becomes one input signal of the mixer 67 by analog-gating the portion other than the horizontal blanking phase portion with the analog gate 66.

Further, the signal supplied from the time-base corrector to the synchronizing separators $64_{-1}$, $64_{-2}$ ... $64_{-8}$ is synchronized and separated therein. The separated synchronizing signals are applied to the NOR circuit 64, and the synchronizing signal from the output of the NOR circuit 65 is supplied to the mixer 67 so as to add a synchronizing signal to the output video signal of the analog gate 66.

The synchronizing signal added here becomes a horizontal synchronizing signal of the reproduced video signal.

Accordingly the NOR circuit 14 receives each output of each synchronizing separator $64_{-1}$, $64_{-2}$ ... $64_{-8}$ to average the jitter-drift components contained in the signal. FIG. 6 shows waveforms of the NOR circuit 65.

That is, waveforms, a, b and c-h show output signals of the synchronizing separators $64_{-1}$, $64_{-2}$ ... $64_{-8}$, respectively, and waveform i shows an output signal of the NOR circuit 65. Waveform j is a signal showing the state of phase-modulation by a jitter-drift component.

Figure 6:
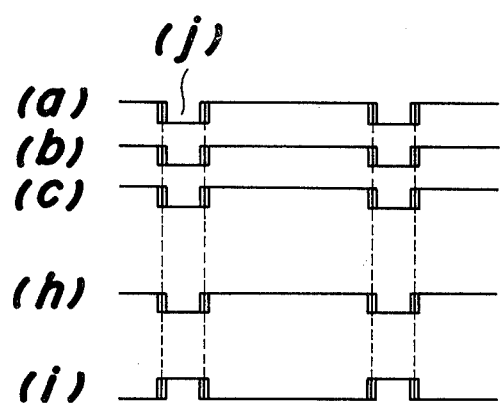
FIG. 6 is a waveform showing signals generated in the apparatus shown in FIG. 5.

As apparent from FIG. 6, each output signal from the synchronizing separators contains a jitter-drift component, but a mean center phase thereof is controlled by the time-base correctors so as to make each channel the same phase. Accordingly, the NOR circuit detects the time priority relationship of synchronizing signals of each channel, and then, the jitter-drift component contained in the rising edge or the trailing edge of the output signal pulse of the NOR circuit is averaged.

As described above in detail, according to the present invention, it becomes possible to obtain the synchronizing signal having a jitter-drift component by the mean residual jitter of all channels relating to video signal transformation, and this synchronizing signal is added as a horizontal synchronizing signal of a reproduced video signal, to stabilize a synchronizing signal so as to obtain a stabilized picture image of good quality.

The present invention is not limited to the above embodiment but can be modified without departing from the scope of the invention.

In adddition to Hadamard transformation, for example time division transformation may be used and not only 8 channels but also 16 channels or 32 channels may also be used.

Moreover the NOR circuit may be replaced by, any logic circuit which performs the similar operation.

As described above, the present invention can provide a recording apparatus for obtaining a proper sampling signal necessary for Hadamard inverse transformation at the time of reproduction even if phase distortion exists in the transmission path of the recording and reproducing system, so that a good reproduced picture image may be obtained.

What is claimed is:

1. A video tape recording apparatus for recording and reproducing a video signal having a horizontal synchronizing signal, comprising means for distributing the video signal to a plurality of channels, a plurality of magnetic recording heads, means for separating a horizontal synchronizing signal from the video signal, means for generating a pulse from the separated synchronizing signal, means to generate sampling signals for sampling the signals in each channel and subjecting the signals to a transformation, means for sensing phase coincidence of the pulse and a sampling signal of one channel, means for mixing the separated synchronizing signal with the output of the means for sensing coincidence for producing a time-base correction signal, means for recording the transformed signals and the correction signal with the magnetic heads, means for detecting the recorded signals, means for generating a resampled signal on the basis of the detected time-base correction signal and for resampling the detected recorded signals, and means for subjecting the resampled signals to an inverse transformation.

2. An apparatus as in claim 1, wherein said means for generating a resampled signal includes an automatic phase control circuit for automatically controlling the phase of the detected recorded signals on the basis of the detected time-base correction signal and an automatic frequency control circuit for automatically controlling the sampling rate on the basis of signals from the phase control circuit and the detected time-base correction signal, said means for sensing phase coincidence including a gate.

3. A video tape recording apparatus for recording and reproducing a video signal having a horizontal synchronizing signal, comprising:

means for distributing the video signal with the synchronizing signal to a plurality of distributed signals, means for recording and reproducing the distributed signals and including a plurality of magnetic heads for producing recorded signals;

said means for recording and reproducing including time-base correction means for generating a time-base correction signal from said horizontal synchronizing signal, means for producing a plurality of channel signals from the recorded signals coincident with the time-base of the time-base correcting means, and logic means for producing a synchronization signal from the time-base correction signal for correcting the time-base contained in each channel signal.

* * * * *